United States Patent Office

3,282,729
Patented Nov. 1, 1966

3,282,729
BARRIER COATED THERMOPLASTIC OLEFIN POLYMER SUBSTRATES
Stanley H. Richardson, Millington, and Gretchen Smitmans Schaufelberger, Basking Ridge, N.J., assignors to Union Carbide Corporation, a corporation of New York
No Drawing. Filed Feb. 27, 1963, Ser. No. 261,527
13 Claims. (Cl. 117—138.8)

This application is a continuation-in-part of United States application Serial Number 39,225, filed June 28, 1960 which is now abandoned.

This invention relates to barrier coated thermoplastic polymer substrates and, preferably, to olefin high polymer substrates coated with a moisture resistant barrier coating composition providing impermeability to gases such as oxygen, and organic liquids.

Packaging formed from thermoplastic polymer includes overwrap film, molded bottles and containers of various shapes. Advantages of these thermoplastic polymer packagings include low unit cost, nonbreakability and an attractive appearance secured through nearly infinite variety in container contour and coloring. Use of thermoplastic polymer for low-cost-per-unit packaging has greatly increased sales of thus packaged consumer goods. The advantages of thermoplastic polymer packaging are not presently available, however, to a number of permeatingly active products such as cosmetics and polishes, which otherwise are ideally adapted to being marketed in thermoplastic polymer packaging. These permeatingly active materials contain essential oils, liquid hydrocarbons, organic esters and ketones which permeate thermoplastic resins. A damaged, unattractive and unsaleable package may result from such permeation. Also, oxygen from the atmosphere can permeate the thermoplastic polymer package and cause deterioration of packaged goods such as cooking oils, where rancidity develops, and oxygen-sensitive materials such as certain photographic compositions.

Highly desirable thermoplastic polymers for packaging are olefin high polymers because they offer good rigidity without brittleness and can easily be fabricated into attractive shapes. Olefin high polymers are therefore the preferred thermoplastic polymer substrates for use in this invention. The term "olefin high polymers" is used in the present specification and claims to denote homopolymers of monoolefinically unsaturated monomers containing from 2 to 10 carbon atoms inclusive and copolymers containing about 70 percent by weight, and preferably at least about 90 percent by weight, of a monoolefinically unsaturated monomer containing from 2 to 10 carbon atoms inclusive, with from about 30 percent by weight to about 10 percent by weight of at least one other olefinically unsaturated monomer copolymerizable therewith, in every case the olefin high polymer being normally solid and of sufficient molecular weight that it can be fabricated into packaging. Illustrative of the suitable homopolymers and copolymers which can be used as olefin high polymer substrates for the barrier coatings of this invention are homopolymers such as low density polyethylene, i.e., essentially linear ethylene polymer having a density of from about 0.91 to about 0.94, and, preferably, high density polyethylene, i.e., essentially linear ethylene homopolymer having a density above about 0.94; other homopolymers such as polypropylene, polybutene-1, poly(3-methylpentene-1), polyhexene-1, polyheptene-1, polyvinyl chloride, and the like; and copolymers, such as, for example, ethylene/propylene copolymers, styrene/acrylonitrile copolymers, ethylene/butene-1, copolymers, ethylene/ethyl acrylate copolymers, ethylene/methyl methacrylate copolymers, ethylene/vinyl acetate copolymers, and the like. This list, however, is intended to be merely illustrative and should not be considered exhaustive of the olefin high polymers which can be used in this invention.

Heretofore, thermoplastic polymers such as high density polyethylene and other olefin high polymers have been rendered impermeable to liquids and gases by forming a barrier coating thereon. The term "barrier coatings" as used herein refers to non-self-supporting films formed on a thermoplastic resin substate of material having impermeation properties superior to the thermoplastic resin substrate on which it is formed and to which it adheres. Barrier coatings for thermoplastic polymer substrates can be broadly classified into two groups: (1) those applied from organic solvent solution and (2) those applied from a water solution. The disadvantages of the former method and the materials used therein are obvious; use of organic solvents appreciably increases raw material costs, necessitates recovery steps and introduces flammability and toxicity hazards.

Barrier coatings which can be applied from water solution are highly desirable. Polyvinyl alcohols, which are polymers containing $-(CH_2-CHOH)-$ groups, can be applied from water solution are in many respects attractive materials for use as barrier coatings for thermoplastic polymer substrates. Applied to thermoplastic polymer surfaces which have been treated by any of a number of means to render them receptive to coatings, polyvinyl alcohols adhere tenaciously, are flexible, clear and transparent, provide an oxygen impermeable barrier, and are resistant to permeation by greases, oils and a wide variety of common organic solvents, such as esters, ethers, ketones, hydrocarbons, and chlorinated hydrocarbons.

The advantage of water solubility in the application of polyvinyl alcohol as a barrier coating becomes its chief drawback, however, when the barrier coating has been formed on the thermoplastic polymer. The poor water resistance of polyvinyl alcohol restricts its use as a barrier coating to those very few applications where nearly anhydrous conditions prevail.

There are a number of methods known for increasing the water resistance of polyvinyl alcohol, but none provides entirely satisfactory results. In spite of various heretofore practiced methods, such as crosslinking the polyvinyl alcohol with potassium dichromate, formaldehyde or phenol-formaldehyde resins, the polyvinyl alcohol still tends to soften, swell and lose adhering strength when exposed to water or even moisture vapor. Hence, polyvinyl alcohol barrier coatings cannot be used where a substantial degree of water-resistance or moisture-proofness is required.

It is an object, therefore, of the present invention to provide polyvinyl alcohol barrier coatings for thermoplastic polymer substrates which offer outstanding water resistance in addition to tenacious adhesion to the substrate, clarity and flexibility.

It is another object to provide a method for applying from water solution water-resistant polyvinyl alcohol barrier coatings for thermoplastic polymer substrates.

We have now discovered that these and other objects of the invention are achieved by applying to the thermoplastic polymer substrate a water solution of polyvinyl alcohol and a trimethylolphenol compound and thereafter maintaining the coated substrate at an elevated temperature for a time sufficient to inter-react substantially all of the trimethylolphenol compound with the polyvinyl alcohol. The resulting cured barrier coating is a water-resistant polyvinyl alcohol which is tenaciously adherent, very flexible and clear.

Surprisingly, in accordance with the present invention water-resistant barrier coatings are able to be applied from water solution.

The superiority of barrier coatings formed by the method of this invention is believed due to a crosslinking of the polyvinyl alcohol (PVA). That is high degree of interreaction takes place between the polyvinyl alcohol and the trimethylolphenol, i.e., that there is extensive crosslinking of the polyvinyl alcohol, is shown by the fact that barrier coatings on thermoplastic polymer substrates comprising polyvinyl alcohol alone are readily soluble in water as described above; similarly, barrier coatings comprising trimethylolphenol alone are readily soluble in organic solvents; but, polyvinyl alcohol-trimethylolphenol compound barrier coatings are not dissolved or softened away from thermoplastic polymer substrates by either organic solvents or water.

To demonstrate that neither of the components of our invention is separately responsible for the excellent barrier properties obtained, the following data are presented.

TABLE I.—GASOLINE PERMEABILITY OF BARRIER COATED HIGH DENSITY POLYETHYLENE BOTTLES:
[PVA/Trimethylolphenol vs. PVA or trimethylolphenol alone]

| Barrier Coating | Percent Loss, 1 Mo. at 77° F. |
| --- | --- |
| Polyvinyl Alcohol (99–100% hydrolyzed; 4–6 centipoises viscosity)/Trimethylolphenol; 100/20. | 0.249. |
| Aqueous solution of trimethylolphenol | 2.96 (severe bottle collapse). |
| Polyvinyl alcohol (99–100% hydrolyzed, 4–6 centipoises viscosity). | 0.37 (one week loss).[1] |

[1] Removed because of bottle collapse after one week.

The barrier coatings of our invention are not only superior in impermeability to polyvinyl alcohol and trimethylolphenol compounds used alone, but also are superior to barrier coatings of crosslinked polyvinyl alcohols heretofore known. To demonstrate this, a glass plate was coated with a polyvinyl alcohol-trimethylolphenol compound barrier coating and a second glass plate was coated with an equal thickness of a potassium dichromate crosslinked polyvinyl alcohol barrier coating. Both glass plates were submerged in boiling water for 15 minutes. The potassium dichromate-polyvinyl alcohol barrier coating softened and was readily lifted from the glass. The polyvinyl alcohol-trimethylolphenol compound barrier coating remained hard and could not be peeled from the glass.

The trimethylolphenol compounds used to crosslink polyvinyl alcohols in forming the barrier coatings of the present invention are trimethylolphenol, 2,4,6-tris(hydroxymethyl)phenol, a white crystalline compounds melting a 84–85° C., and the alkali and alkaline earth metal salts of trimethylolphenol, especially the calcium, sodium and barium trimethylolphenates. The trimethylolphenates per se can be reacted with the polyvinyl alcohol or they can be first converted to trimethylolphenol in situ by sufficiently acidifying a solution of the trimethylolphenate, e.g. to a pH of about 5–7.

Trimethylolphenol and the trimethylolphenates are readily soluble in water, low molecular weight alcohols, and phenols, sparingly soluble in low molecular weight ketones, esters, nitromethane and similar polar solvents. They are substantially in soluble in hydrocarbons, halogenated hydrocarbons and similar nonpolar solvents. An aqueous solution of these compounds can be freely diluted with water soluble polar solvents such as methanol, ethanol, isopropanol, acetone and the like. These trimethylolphenol compounds can be represented by the general formula

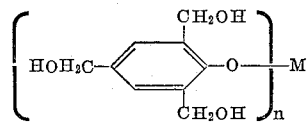

wherein M is a member selected from the group consisting of hydrogen and alkali metals and alkaline earth metals and $n$ is an integer equal to the valence of M. Among the alkali metals which form suitable trimethylolphenates, those particularly desirable in forming trimethylolphenates and deserving of special mention are lithium, sodium and potassium. Among the alkaline earth metals which form suitable trimethylolphenates, those deserving special mention are magnesium, calcium, strontium and barium. The trimethylolphenol compound can be blended with the polyvinyl alcohol as a solid or, for greater convenience, as an aqueous solution. A very convenient and highly desirable form of trimethylolphenol for use in the method of this invention is an aqueous solution thereof containing about 45% by weight trimethylolphenol as can be obtained by the method described and claimed in U.S.P. 2,889,374 to C. Y. Meyers. The presence of organic solvents in the coating solution causes precipitation of the polyvinyl alcohol and is to be avoided.

"Polyvinyl alcohol" as the term is used in the present specification and claims refers to a normally solid polymeric material, soluble in water, but insoluble in most organic solvents and characterized by the presence of $-(CH_2-CHOH)-$ units in the polymer chain. These polymers are ordinarily prepared by the replacement of the acetate groups of polyvinyl acetate with hydroxyl groups as by hydrolysis or alcoholysis. The percent of acetate groups replaced by hydroxyl groups is the degree of hydrolysis of the polyvinyl alcohol thus formed and indicates the percent of hydroxyl groups present in the polyvinyl alcohol out of the total possible hydroxyl groups. As is explained hereinbelow the crosslinking reaction by which the superior barrier coatings of this invention are obtained proceeds through the hydroxyl groups on the polyvinyl alcohol. Therefore only substantially completely hydrolyzed polyvinyl alcohols are useful in this invention. By the term "substantially completely hydrolyzed" in the present specification and claims is meant a degree of hydrolysis of above about 85%. A polyvinyl alcohol with less than about 85% degree of hydrolysis will react only very slightly with the trimethylolphenol compound and give inferior, nonmoisture-proof coatings. We have found that polyvinyl alcohols having an hydroxyl content above 88% and particularly above about 95% provide superior barrier coatings in terms of water and solvent resistance, clarity and flexibility and adhering strength. Hydroxyl group contents of 99% to 100% provide the best barrier coatings and are particularly preferred for use in this invention. Moreover, these latter polyvinyl alcohols exhibit maximum rate of cure with the trimethylolphenol to a completely cured, thoroughly crosslinked resin coating.

Properties of the final crosslinked polyvinyl alcohol are also to an extent dependent upon the molecular weight of the polyvinyl alcohol used. Generally speaking, the higher the molecular weight of the polyvinyl alcohol, the greater the strength of the cured barrier coating. The higher molecular weight polymers, however, due to their great chain lengths are less soluble in water than intermediate and lower molecular weight polymers. Ease of incorporation and dissolution of intermediate and lower molecular weight polymers makes these preferable from a processing standpoint. The relative molecular weight of polyvinyl alcohols can be conveniently determined by preparing a 4% by weight aqueous solution of the polymer and determining the viscosity in centipoises by the Hoeppler falling ball method described by F. Hoeppler in "Viscosity Measurement of Liquid Substances and A New Universal Viscometer" Chem. Zeitung 59 62–63 (1933). We prefer polyvinyl alcohols whose molecular weights as determined by the Hoeppler method provide viscosities, herein termed "4% viscosity," of between about 2 and 50 centipoises. We have found that such polymers provide solutions having desirable viscosities at practical concentrations of polymer for coating applications. Ordinarily, coating solutions contain from about 20 to about 65 parts by weight of solids per 100 parts by weight of the coating solution. Such coating solutions can be conveniently applied to a high density polyethylene resin substrate by a wide variety of techniques such as roller coating, brushing, spraying, knife-coating, dipping or slushing, or equivalent coating techniques. Greater than 65% solids in the barrier coating solutions of our invention generally result in a highly viscous solution which is difficult to apply, especially with automatic equipment. On the other hand, less than about 20% by weight of solids provides a generally uneconomical coating solution which is likely too fluid to be sprayed onto a surface satisfactorily. Such solution, however, does cling sufficiently when dip coated on a polyethylene substrate to provide adequate barrier coatings. We prefer 20 to 25% solids in our coating solutions for their easy applicability.

The optimum polyvinyl alcohol-trimethylolphenol ratio in the barrier coatings is in some degree dependent upon the particular polyvinyl alcohol used and the combination of properties desired. In general, an increase in the proportion of polyvinyl alcohol having a given degree of hydrolysis increases the flexibility of the product; an increased proportion of trimethylolphenol, on the other hand, gives increased rates of cure and increased water and organic solvent resistance. The use of as little as 6% by weight of trimethylolphenol in our compositions is beneficial, imparting improved barrier properties to the coating. For example, a composition containing 6 parts of a trimethylolphenol per 100 parts by weight of substantially completely hydrolyzed polyvinyl alcohol exhibits improved water resistance over that exhibited by the polyvinyl alcohol alone. The obtaining of maximum barrier properties generally requires a higher trimethylolphenol to polyvinyl alcohol weight ratio, about 10 to 40 parts of the former per 100 parts of the latter, and preferably from 10 to 30 parts of trimethylolphenol per 100 parts of polyvinyl alcohol. Increases in the ratio beyond 40 parts trimethylolphenol per 100 parts of polyvinyl alcohol progressively reduce flexibility of the barrier coatings although progressively increasing solvent and water resistance. Such higher trimethylolphenol proportions hence are useful where the solvent resistance properties are of paramount importance and flexibility of comparatively less importance.

Modifiers such as pigments, stabilizers, gel depressants, surfactants, antioxidants, extenders and the like can be incorporated and dispersed in the barrier coating composition, as by mixing in a paint mill, ball mill, paddle blender or the like provided their presence does not too adversely affect the requisite barrier properties of the coating.

In a preferred procedure the barrier coatings are prepared and applied to high density polyethylene substrates to give barrier coating polyethylene articles in the following manner:

A polyvinyl alcohol having a viscosity of between 4 and 35 centipoises and preferably 4 to 10 centipoises is dissolved in water and trimethylolphenol is added to the water solution of the polyvinyl alcohol as an aqueous solution or as a solid to give the desired ratio of components. To facilitate and make more rapid curing of the polyvinyl alcohol after a thorough mixing of the components the solution is acidified to a pH of 5 or less using mineral acids such as hydrochloric, sulfuric, phosphoric, sulfonic acids and the like or organic acids such as oxyalic acid; or acidic salts of these acids such as ammonium sulfamate; or esters such as tris-(beta-chloroethyl)phosphate. Other acidic or acid (H+) releasing compounds than these can be used provided under the conditions in which they are used they lower the pH of the coating mixture to less than 5. It is important to note that the trimethylolphenol-polyvinyl alcohol compositions used as barrier coatings can be crosslinked by heat alone, but these compositions cure more slowly and the resulting coatings are darker in color than those prepared using an acidic or acid (H+) releasing catalyst.

After preparation of the coating solution the thermoplastic polymer substrate which has been pretreated to render it more receptive to coatings or not as desired is coated with a sufficient thickness of barrier coating composition, usually at least about 0.1 mil thickness to impart properties of the barrier to the substrate. Following application of the coating the coated substrate is cured at 200° F. or higher for a time sufficient to substantially completely crosslink the polyvinyl alcohol. This time will be roughly proportional to the thickness of the coating on the substrate using a given composition but will naturally vary with the presence or absence of acidic conditions, heat applied, ratio of components and degree of hydrolysis of the polyvinyl alcohol. Optimum water-resistance is achieved when the compositions are completely cured at a temperature of 200° F. and more. Where water-resistance is not highly critical it is possible to cure at less than 200° F. and hence coat thermoplastic polymer substrates unable to withstand heat in excess of 200° F. Ordinarily though, it will be desired to impart water-resistance and hence thermoplastic polymers having heat distortion temperatures in excess of the cure temperature must be employed. For all practical purposes this requires thermoplastic polymer which can withstand temperatures in excess of 200° F. as evidenced by the polymer being able to support its own weight without warping at a temperature of about 200° F.

The following examples are presented to illustrate the practice of the present invention and are not intended as limitative of its scope. All parts and percentages are by weight.

*Example 1.*—A coating composition was prepared by dissolving 150 parts of polyvinyl alcohol (99% hydrolyzed, 4% viscosity: 4–6 centipoises) in 600 parts water. Into each of three equal portions of this solution was stirred 7.2, 14.4 and 21.6 parts, respectively, of a solution containing 45% trimethylolphenol. Each solution was acidified to pH 3 with phosphoric acid and then applied to surfaces of two sets of samples of 14 point white bleach boxboard, which had previously been extrusion coated with 1.5 mils of high density polyethylene (density=0.96, melt index=6–7). Application of the solutions was by means of a wire wound drawdown rod. The polyethylene coating had not been treated prior to the application of the barrier coatings. Following a ten-minute air dry period, one set of samples was baked in an oven for 15 minutes at 250° F., the other for 5 minutes at 300° F. All coatings had excellent adhesion to the substrates following baking. Thickness of the baked coatings was approximately 0.05 mil. The coated polyethylene-board structures were then tested for oxygen permeabilities (ASTM 1434–56T). Permeabilities of less than 1 cc./100 in.$^2$/24 hrs. were obtained on all samples. This is equal to the permeability of gasproof cellophane. A nonbarrier coated control sample had a permeability of 425 cc./100 in.$^2$/24 hrs. when tested by the same method.

*Example 2.*—Samples of 1.2 mil thick high density polyethylene film (0.950–0.955 density, 6.5–7.5 melt index) previously electrostatically treated, were coated using the technique of Example 1 with a solution consisting of 100 parts polyvinyl alcohol (99% hydrolyzed, 4–6 cps. viscosity) dissolved in 400 parts water to which was added 35.9 parts of a 45% aqueous trimethylolphenol solution (16.2 parts trimethylolphenol) and sufficient phosphoric acid to reduce the pH of the mixture to 2.5. Some film samples were coated on one side only and some on both sides. Following a 10 minute air drying period, the films were baked for ½ hour at 200° F. Final barrier coating thickness was 0.1 mil per side. The coated films were then tested for permeability by lemon oil vapors in the following manner.

Each of a set of standard Thwing-Albert vapometer cups was filled with approximately 55 cc. of lemon oil.

Two and one-half inch diameter discs of the film samples (A) uncoated, (B) coated on one side and (C) coated on both sides were fitted across the cup openings. The cups were then stored at room temperature and loss of lemon oil vapor was measured at various time intervals.

Into each of another set of cups was placed 12 parts of a paste prepared by mixing lemon oil with a powdered silica aerogel in the ratio of 10 parts lemon oil to 2 parts silica. The paste-filled cups were then fitted with film discs, as were those containing pure lemon oil, and were stored at the same time under the same conditions. The vapor pressure of lemon oil in the paste-filled cups could be expected to be lower than that in the oil-filled cups. The superiority of the barrier coated films in resistance to permeation by lemon oil vapor may be seen in the data of Table II and II-A.

TABLE II.—WEIGHT LOSS OF LEMON OIL VAPOR THROUGH 2½" DIAMETER DISCS OF FILM, PARTS

| Exposure Days | Control, Uncoated Film (A) | One Side Coated Film (B) | | Two Sides Coated Film (C), 0.1 mil per side |
|---|---|---|---|---|
| | | Coated Side to Permeant | Coated Side To Air | |
| | Lemon Oil as Permeant | | | |
| 3 | .86 | .06 | .03 | .02 |
| 10 | 2.03 | .09 | .08 | .04 |
| 31 | [1] 7.24 | .56 | .30 | .20 |

[1] Sticky surface on film.

TABLE II-A.—WEIGHT LOSS OF LEMON OIL VAPOR THROUGH 2½" DIAMETER DISCS OF FILM, PARTS

| Exposure Days | Control, Uncoated Film (A) | One Side Coated Film (B) | | Two Sides Coated Film (C), 0.1 mil per Side |
|---|---|---|---|---|
| | | Coated Side to Permeant | Coated Side To Air | |
| | LEMON OIL/SILICA AEROGEL 5/1 AS PERMEANT | | | |
| 3 | .62 | .05 | .04 | .02 |
| 8 | .84 | .06 | .04 | .02 |
| 27 | 4.07 | .30 | .15 | .05 |

*Example 3.*—Fifteen, four-ounce round bottles, blow molded from high density polyethylene (0.96 density, 0.6–0.8 melt index) were surface treated with chromic acid in the manner described by Horton in U.S. Reissue Patent 24,062 to improve coatings adherence. Sets of five bottles each were than coated on the inside with one of three solutions prepared in Example 1.

The coatings were applied by filling the bottles with solution, draining until all excess solution was removed, air drying for one hour and finally baking for three hours at 210° F. in vacuum oven (12 mm. Hg).

The coated bottles were then tested for impermeability in the following manner:

Each bottle was filled to shoulder level with a solution of 20% lemon oil in cosmetic grade alcohol, capped and stored at 77° F., and 60% of relative humidity. Weight loss from the sealed bottles was measured at one-week intervals until some type of failure occurred. Since alcohol alone does not permeate polyethylene appreciably, it can be assumed that any significant weight loss is due to loss of lemon oil.

Weight loss over a 2 month period from the bottles ranged between 0.06 and 0.8%.

*Example 4.*—Five chromic acid-treated 0.96 density polyethylene bottles were slush coated with an aqueous solution of 19.5 parts trimethylolphenol and 100 parts polyvinyl alcohol (99% hydrolyzed, 4–6 centipoises viscosity). Each was filled as in Example 3 and baked as in Example 3. Each was filled with 100 cc. of gasoline and 20 cc. water. After storage for three months at room temperature, the bottles had lost an average of 0.622% of their contents. Polyvinylidene chloride coated bottles similarly tested lost 5.04% in only one week and so badly collapsed that they were removed from the test.

*Example 5.*—To illustrate the suitability of our compositions as primers for overlacquers the following experiment is presented:

Automotive interior trim pieces, injection molded from the high density polyethylene (0.96 density 0.06–0.8 melt index) were surface treated using chromic acid. The composition of Example 4 was applied by brushing. Following an air dry period of one hour and baking at 220° F. for ½ hour, two types of standard commercial automotive topcoats, one an acrylic, the other nitrocellulose, were applied to separate pieces by spraying. The topcoated pieces were force dried for 10 minutes at 215° F. Adhesion of the overlacquers to the primed surfaces was tested with a pen knife and was excellent.

*Example 6.*—As stated previously, polyvinyl acetates, in which the acetate groups have been at least 88% hydrolyzed to hydroxyl groups, when reacted with trimethylolphenol produce the most desirable barrier characteristics. This is illustrated by comparing the permeabilities of a series of coatings in which alcohols have different degrees of hydrolysis were used in combination with trimethylolphenol. Results are summarized in Table III.

TABLE III.—EFFECT OF DEGREE OF HYDROLYSIS OF POLYVINYL ALCOHOL ON BARRIER PROPERTIES OF PVA/TRIMETHYLOLPHENOL COATINGS

| Percent Hydrolysis | Centipoises Hoeppler Method | Ratio, Alc./Tri-methylol-phenol | Permeant | Percent Weight Loss | Time Weeks |
|---|---|---|---|---|---|
| 18 | 4–6 | 100/10 | Lemon Oil | 1.04 | 1. |
| 88–89 | 4–6 | 100/10 | | 0.36 | 4 mo. |
| 87–89 | 35–45 | 100/10 | | 2.17 | 8. |
| 87–89 | 35–45 | 100/30 | | 0.12 | 8. |
| 99–100 | 4–6 | 100/10 | | 0.106 | 8. |
| 99–100 | 4–6 | 100/30 | | 0.059 | 8. |

*Example 7.*—It may at first appear that trimethylolphenol is similar to water-soluble resole resins heretofore known and it might be thought the compositions of our invention are similar to those that can be obtained by reacting polyvinyl alcohol and a water-soluble resole resin. To demonstrate that trimethylolphenol compounds are unique in the properties they impart to polyvinyl alcohol, compositions were made up using a water-soluble resole in place of the trimethylolphenol compound and applied to 4 ounce Boston Round bottles and the results compared with those obtained using the trimethylolphenol compound under the same cure conditions. Results are tabulated in Table IV below.

TABLE IV.—WATER SOLUBLE PHENOLIC RESIN VS. TRIMETHYLOLPHENOL REACTION PRODUCTS WITH POLYVINYL ALCOHOL:PERMEATION OF 20% LEMON OIL IN ETHYL ALCOHOL

| Barrier A | Coating B | Ratio A to B | Percent Loss in 3 Months |
|---|---|---|---|
| Polyvinyl Alcohol (99–100% hydrolyzed 4–6 centipoises viscosity). | Trimethylolphenol | 100/10 | 0.197 |
| Do | Resole [1] | 100/10 | 1.96 |
| Do | Trimethylolphenol | 100/20 | 0.157 |
| Do | Resole [1] | 100/20 | 1.77 |

[1] A water soluble, heat reactive phenolic resin prepared by using 1.5 moles formaldehyde per mole of phenol. The resultant resin is 80–120 cps. viscosity at 66% solids.

*Example 8.*—Four-ounce Boston Round bottles were blow molded from a styrene/acrylonitrile copolymer containing 72 percent by weight combined styrene and 28 percent by weight combined acrylonitrile. The bottles were surface treated with chromic acid and then coated on the inside with 0.15 gram coating, in the manner described in Example 3, and cured for 24 hours at 82°

C. Two coated bottles and an uncoated control were filled to shoulder level with cyclohexanone, a solvent for the styrene/acrylonitrile copolymer. Results are tabulated in Table V below.

TABLE V

| Coated Bottle No. | Percent Product Loss | | | |
|---|---|---|---|---|
| | 1 hour | 4 days | 1 month | 3 months |
| 1 | | 0.00 | 0.00 | 0.00 |
| 2 | | 0.00 | 0.00 | 0.00 |
| Control | Dissolved | | | |

*Example 9.*—Six-ounce cylindrical bottles were blow molded from a polyvinyl chloride polymer containing 15 percent by weight of a proprietary impact modifier. The bottles were surface treated with chromic acid and then coated on the inside with 0.16 gram coating, in the manner described in Example 3, and cured for 24 hours at 82° C. Two coated bottles and two uncoated controls were filled to shoulder level with an 80/20 by volume mixture of gasoline and water. Results are tabulated in Table VI below.

TABLE VI

| Coated Bottle No. | Percent Product Loss | | | |
|---|---|---|---|---|
| | 1 hour | 4 days | 1 month | 3 months |
| 1 | | 0.02 | 0.23 | 0.67 |
| 2 | | 0.02 | 0.20 | 0.56 |
| Control 1 | | 0.02 | 0.21 | 0.75 |
| Control 2 | | 0.00 | 0.20 | 0.78 |

*Example 10.*—Example 9 was repeated except for the substitution of an 80/20 by volume mixture of ethanol and lemon oil for the gasoline/water mixture. Results are tabulated in Table VII below.

TABLE VII

| Coated Bottle No. | Percent Product Loss | | | |
|---|---|---|---|---|
| | 1 hour | 4 days | 1 month | 3 months |
| 1 | | 0.00 | 0.01 | 0.09 |
| 2 | | 0.02 | 0.10 | 0.35 |
| Control | | 0.03 | 0.22 | 0.64 |

*Example 11.*—Six-ounce cylindrical bottles were blow molded from a 60–65 percent crystalline polypropylene having a melt flow of 1.0 The bottles were surface treated with chromic acid and then coated on the inside with 0.20 gram coating, in the manner described in Example 3, and cured for one hour at 104° C. Three coated bottles and two uncoated controls were filled to shoulder level with an 80/20 by volume mixture of gasoline and water. Results are tabulated in Table VIII below.

TABLE VIII

| Coated Bottle No. | Percent Product Loss | | |
|---|---|---|---|
| | 4 days | 1 month | 3 months |
| 1 | 0.02 | 0.38 | 1.69 |
| 2 | 0.05 | 0.51 | 1.59 |
| 3 | 0.06 | 0.59 | 2.30 |
| Control 1 | 6.9 | 45.4 | 69.6 |
| Control 2 | 6.7 | 44.6 | 70.2 |

The control bottles collapsed in four days.

*Example 12.*—Example 11 was repeated except that carbon tetrachloride was substituted for the gasoline/water mixture. Results are tabulated in Table IX below.

TABLE IX

| Coated Bottle No. | Percent Product Loss | | |
|---|---|---|---|
| | 4 days | 1 month | 3 months |
| 1 | 0.00 | 0.36 | 2.44 |
| 2 | 0.01 | 0.27 | 1.99 |
| 3 | 0.00 | 0.24 | 1.61 |
| Control 1 | 10.6 | 88.7 | 100 |
| Control 2 | 10.6 | 89.6 | 100 |

The control bottles collapsed in four days.

*Example 13.*—Four-ounce Boston Round bottles were blow molded from a polyethylene having a density of 0.92. The bottles were surface treated with chromic acid and then coated on the inside with 0.09 gram coating, in the manner described in Example 3, and cured for 15.5 hours at 95° C. Three coated bottles and two uncoated controls were filled to shoulder level with turpentine. Results are tabulated in Table X below.

TABLE X

| Coated Bottle No. | Percent Product Loss | | |
|---|---|---|---|
| | 4 days | 1 month | 3 months |
| 1 | 0.00 | 0.03 | 0.18 |
| 2 | 0.00 | 0.02 | 0.16 |
| 3 | 0.00 | 0.23 | 0.76 |
| Control 1 | 0.60 | 11.8 | 32.61 |
| Control 2 | 0.60 | 9.9 | 32.27 |

The control bottles collapsed in four days.

*Example 14.*—Pinhole-free coatings are applied, as described in Example 3, to containers blow molded from (A) polycarbonate prepared from the reaction of bisphenol-A and a carbonate precursor such as phosgene; (B) polyhydroxyether thermoplastic copolymer prepared by the reaction of equimolar amounts of bisphenol-A and epichlorohydrin; (C) polystyrene; (D) ethylene/propylene copolymer; (E) ethylene/ethyl acrylate copolymers; and (F) ethylene/vinyl acetate copolymer. Permeability tests are conducted in the manner described in Example 3 using (1) lemon oil/alcohol mixtures; (2) gasoline/water mixtures; and (3) cyclohexanone. Results of the tests are identical to those obtained in Example 3.

While not desiring to be bound to any particular theory, it is believed that the superiority of our barrier coating compositions is due to the absence of reactive ring hydrogens on the trimethylolphenol. Reactive ring hydrogens are normally present in the positions ortho and para to the phenolic hydroxyl group in phenolic resins. In trimethylolphenol, however, these ring positions are occupied by methylol groups. Methylol groups present in the reaction system, on the trimethylolphenol or on the phenolic resin, will react with either (A) a reactive ring hydrogen, if any are available, or (B) another methylol group, or (C) some other reactive group, e.g., an hydroxyl group. Reaction A proceeds much more rapidly than B or C and so long as there are reactive ring hydrogens available, the methylol groups react almost exclusively therewith. The molecules in the system are immobilized because of the development of cross-linkages. The retarded movement of both the methylol groups and the other reactive groups greatly inhibits reaction. In a polyvinyl alcohol/phenolic resin system, the hydroxyl groups do not react to any appreciable extent with the methylol groups until the reactive ring hydrogens on the phenolic resin are substantially exhausted; and cross-linking causes a retardation of molecule mobility. Consequently, the polyvinyl alcohol molecules are, in all probability, merely mechanically mixed in an unreacted state within the resin system. Of course, the presence of unreacted hydroxyl groups on the polyvinyl alcohol detracts from the water resistance of the final product.

In a trimethylolphenol-polyvinyl alcohol system, however, there are no reactive ring hydrogens present and the hydroxyl groups on the polyvinyl alcohol are able to compete successfully for methylol groups against the methylol-methylol auto-condensation reaction, and as a result the trimethylol-phenol and polyvinyl alcohol are chemically interreacted with one another to a very great extent. It is possible that this extensive chemical interreaction is responsible for the many outstanding properties, hereinafter more fully set forth, of the compositions of our invention.

What is claimed is:

1. Barrier coated article comprising thermoplastic olefin high polymer capable of supporting its own weight without warping at 200° F. and adhering thereto a film comprising a cured mixture of 100 parts by weight of substantially completely hydrolyzed polyvinyl alcohol and at least 6 parts by weight of a trimethylolphenol compound.

2. Barrier coated article claimed in claim 1 wherein said olefin high polymer is high density polyethylene.

3. Barrier coated article claimed in claim 1 wherein said olefin high polymer is low density polyethylene.

4. Barrier coated article claimed in claim 1 wherein said olefin high polymer is styrene/acrylonitrile copolymer.

5. Barrier coated article claimed in claim 1 wherein said olefin high polymer is polyvinyl chloride.

6. Barrier coated article claimed in claim 1 wherein said olefin high polymer is polypropylene.

7. Barrier coated article comprising thermoplastic olefin polymer capable of supporting its own weight without warping at 200° F. and adhering thereto a film comprising a cured mixture of 100 parts by weight of substantially completely hydrolyzed polyvinyl alcohol and from 10 to 40 parts by weight of a trimethylolphenol compound.

8. Barrier coated article comprising thermoplastic olefin polymer capable of supporting its own weight without warping at 200° F. and adhering thereto a film comprising a cured mixture of 100 parts by weight of polyvinyl alcohol having an hydroxyl content of at least 85% and from 10 to 30 parts by weight of a trimethylolphenol compound.

9. The article claimed in claim 8 wherein the trimetholylphenol compound is 2,4,6 tris(hydroxymethyl)-phenol.

10. The article claimed in claim 8 wherein the trimethylolphenol compound is 2,4,6 tris(hydroxymethyl)-calcium phenate.

11. Barrier coated article comprising thermoplastic olefin polymer capable of supporting its own weight without warping at 200° F. and adhering thereto a film comprising a cured mixture of 100 parts by weight of polyvinyl alcohol having an hydroxyl content of at least 88% and from 10 to 30 parts by weight of a trimethylolphenol compound.

12. Barrier coated article comprising thermoplastic olefin polymer capable of supporting its own weight without warping at 200° F. and adhering thereto a film comprising a cured mixture of 100 parts by weight of polyvinyl alcohol having an hydroxyl content of at least 95% and from 10 to 30 parts by weight of a trimethylolphenol compound.

13. Barrier coated article comprising thermoplastic olefin polymer capable of supporting its own weight without warping at 200° F. and adhering thereto a film comprising a cured mixture of 100 parts by weight of polyvinyl alcohol having an hydroxyl content of at least 99% and from 10 to 30 parts by weight of a trimethylolphenol compound.

References Cited by the Examiner

UNITED STATES PATENTS

| Re. 24,062 | 9/1955 | Horton | 215—1.5 |
| 2,579,329 | 12/1951 | Martin | 260—621 |
| 2,889,374 | 6/1959 | Meyers | 260—621 |
| 2,897,092 | 7/1959 | Miller | 117—138.8 X |
| 2,958,605 | 11/1960 | Leiner et al. | 260—621 X |
| 3,023,129 | 2/1962 | Hersh et al. | 260—29.3 |
| 3,071,430 | 1/1963 | McCance et al. | |

OTHER REFERENCES

Brown, C. F.: Studies of Thermosetting Polyvinyl Alcohol Systems. Rubber Age, November 1952, (pp. 211–214 relied on).

WILLIAM D. MARTIN, *Primary Examiner.*

R. HUSACK, *Assistant Examiner.*